R. B. GILCHRIST.
ICE CREAM LADLE.
APPLICATION FILED APR. 16, 1910.
1,109,577.
Patented Sept. 1, 1914.
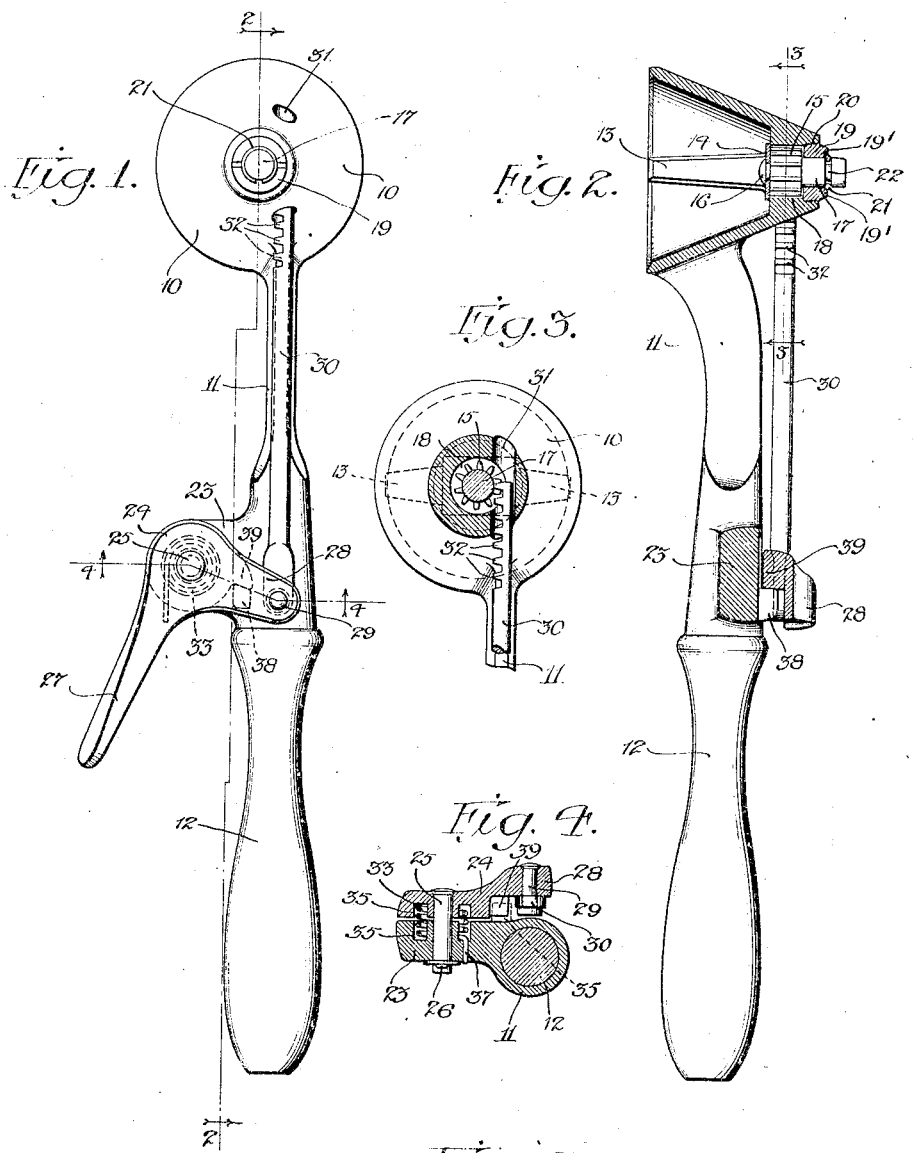
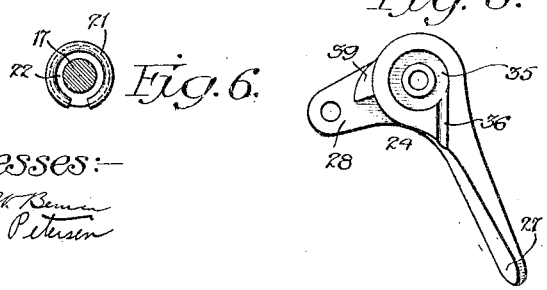
Witnesses:
Inventor:—
Raymond B. Gilchrist
By: Fred Gerlach
Atty.

UNITED STATES PATENT OFFICE.

RAYMOND B. GILCHRIST, OF NEWARK, NEW JERSEY, ASSIGNOR TO THE GILCHRIST COMPANY, OF NEWARK, NEW JERSEY, A CORPORATION.

ICE-CREAM LADLE.

1,109,577.  Specification of Letters Patent.  Patented Sept. 1, 1914.

Application filed April 16, 1910. Serial No. 555,878.

*To all whom it may concern:*

Be it known that I, RAYMOND B. GILCHRIST, a resident of Newark, in the county of Essex and State of New Jersey, have invented certain new and useful Improvements in Ice-Cream Ladles, of which the following is a full, clear, and exact description.

The invention relates to ice-cream ladles and like articles.

A desideratum in ice-cream dippers is to provide a device comprising a scraper and a bowl of such construction that the scraper may be quickly and conveniently placed in and removed from the bowl so that the bowl may be readily cleaned.

A further desideratum, in an ice-cream dipper comprising a bowl and a scraper and operating mechanism for the scraper, is to provide a device in which the scraper may be removed from the bowl without requiring some peculiar operation or manipulation of the scraper operating mechanism in order to release the scraper, so it may be removed from the bowl.

In prior dishers, so far as I am aware, it has been necessary to either disconnect the operating-mechanism from the scraper or to manually operate some holding-means before the scraper could be removed from the bowl, and the present invention designs to provide an improved device in which the holding-means operates automatically, when the scraper is placed in operative position in the bowl, to facilitate the removing and inserting operation of the scraper.

Another object is to provide an improved device in which the scraper can be removed from the bowl without manipulating, or independently of, the mechanism for rotating the scraper, so that said mechanism may remain in operative relation to the bowl when the scraper and parts connected thereto have been inserted into operative position in the bowl.

The invention further designs to provide an ice-cream dipper, or ladle of improved construction, in which the scraper-pinion is completely housed and projections on the outer side of the bowl are avoided.

The invention consists in the several novel features hereinafter set forth and more particularly defined by claims at the conclusion hereof.

In the drawings: Figure 1 is an inverted plan of a device embodying the invention. Fig. 2 is a section on line 2—2 of Fig. 1. Fig. 3 is a section on line 3—3 of Fig. 2. Fig. 4 is a section on line 4—4 of Fig. 1. Fig. 5 is a detail plan of the operating lever. Fig. 6 is a detail showing the split-ring for holding the scraper in the bowl.

The improved ladle comprises a bowl 10, of any suitable form having integrally formed therewith a handle-shank 11, which is provided with a handle 12. A resilient scraper 13, usually comprising a pair of arms fitting against the inner face of the bowl, has its central portion 14 fitting across the bottom or deepest portion of the bowl and has rigidly secured thereto a pinion 15 which may be riveted to the scraper as at 16 and is disposed within an opening 18 formed in the bottom of the bowl. A stud 17 integrally formed with the pinion 15 extends downwardly from the pinion and is journaled in a bushing 19 which is connected by a screw-thread 20 to the bowl beneath the pinion 15. In practice, these bowls are sometimes formed of a soft metal, such as aluminum, and the bushing 19 being formed of a harder metal furnishes a bearing for the scraper-spindle or stud which is more durable and firm than a bearing in the soft metal would be. The scraper 13 engaging the bowl limits the downward movement of the pinion and spindle secured thereto, and a split resilient ring 21 held in an annular groove 22 having its outer edge projecting beyond the periphery of the spindle, serves as automatic holding means for the scraper, the projecting portion of this ring being disposed to engage the bushing 19 and prevent the scraper from being removed from the bowl in ordinary use. This ring, being split, is contractible and expansible and has its outer edge rounded, so that it will be compressed within groove 22 when the spindle is forced upwardly or when the entire device is held in the hand and the lower end of the spindle is given a blow against a counter or table, so that sufficient inward pressure will be exerted by the inner edge 19′ of the bushing 19 to contract the spring in the groove 22 and cause the spindle to pass upwardly through the bushing and release the scraper and pinion carried thereby. When this has been done the scraper will fall out of or pass out of the bowl when the latter is inverted. When the scraper has been removed from the bowl and is to be replaced therein, it is merely necessary to place the lower end of the spindle in the bushing and force the scraper downwardly, the upper edge of the bearing in the bushing will then contract ring 21, and the spindle will pass through the bushing and into operative position, as seen in Fig. 2, and when the scraper, pinion and spindle are passed into operative position, ring 21 will automatically expand into its normal position and secure the scraper in operative relation to the bowl. Thus, it will be seen that there is provided automatically operating holding-means for holding the scraper, its operating pinion and the spindle in operative relation to the bowl, and which is automatically released to disconnect the scraper from the bowl by pressure against the spindle.

Handle-shank 11 is provided with a laterally offset integral lug 23 to which an angular horizontally disposed finger-lever 24 is removably pivoted by a stud 25 secured to the lever and extending through said lug, being provided at its upper end with a washer and a pin 26 for holding the lever in pivoted and connected relation to the handle. The lever comprises a backwardly and outwardly extending finger-piece 27 and an inwardly extending arm 28 to which is pivotally connected by a pin 29, a rack-bar 30, which extends beneath the shank 11 and through a channel 31 extending through the bowl at the side of pinion 15 and intersecting opening 18 in the bowl, in which the pinion is disposed, so that the pinion and a portion of the rack-bar will be completely inclosed. Teeth 32 on bar 30 are adapted to mesh with pinion 15 to rotate the latter and the scraper secured to the pinion.

A coil-spring 33 is disposed in pockets 34 and 35 respectively formed in the contiguous faces of lever 24 and lug 23 to inclose the spring and one end of this spring is held in a groove 36 in the lever and the other end is secured to the lug, as at 37. The pressure of this spring is thus applied to retract the finger-lever and parts operated thereby, including the scraper. A lug 38 on the handle-shank is engaged by a coöperating stop 39 on the finger-lever to limit the movement of the lever in one direction and causes the lever to be held in its normal position by a spring 33. This operating mechanism is thus held in normal position and is of such construction that it may remain in its normal operative position, while the scraper, pinion 15 and spindle 16 are being removed from or replaced in the bowl as already described, so that the scraper and its pinion will be held in operative position in the bowl independently of the operating-mechanism and so that removal and displacement of the scraper may be effected without manipulation of the operating-mechanism carried by the handle or regardless of what position the operating-mechanism may be in, thus avoiding the necessity, in devices heretofore made, of manipulating the operating mechanism into an inoperative position, or some peculiar relation other than normal, to permit removal and replacement of the scraper and its connected parts. It will also be observed that there are no unnnecesary projections on the outside of the bowl and that the pinion is completely housed and protected.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. In an ice-cream disher, the combination of a handle, a bowl on the handle, a rotatable scraper removably mounted in the bowl and a catch for securing the scraper in operative, rotatable position in the bowl, said catch being adapted to automatically pass into position to secure the scraper upon insertion of the scraper in the bowl.

2. In an ice-cream disher, the combination of a handle, a bowl on the handle, a scraper rotatably and removably held in the bowl, a spindle for the scraper, means for rotating the scraper, and a device for rotatably securing the scraper in operative rotatable position in the bowl, said device acting automatically to secure the scraper in operative position when force is applied to the spindle to place the scraper in the bowl.

3. In a device of the character described, the combination of a handle, a bowl on the handle, a scraper rotatably and removably held in the bowl, a spindle for the scraper, means for rotating the scraper, and a device for rotatably securing the scraper in operative rotatable position in the bowl, said scraper being releasable from said bowl by force applied to the spindle to displace the scraper from the bowl.

4. In a device of the character described, the combination of a handle, a bowl connected to the handle, a spindled scraper rotatably and removably held in the bowl, mechanism mounted on the handle for rotating the scraper, and yieldable holding-means for engaging the spindle of the scraper operating automatically to engage and retain the scraper in the bowl when the latter is inserted in the bowl, and yieldable to pressure applied to the spindle to remove the scraper from the bowl.

5. In a device of the character described, the combination of a handle, a bowl on the handle, a scraper rotatably and removably held in said bowl, a pinion operatively connected to said scraper, and removable through the bowl, operating mechanism for said pinion, and means independent of said operating mechanism and said pinion, for holding the scraper in the bowl, said scraper being rotatable when held by said holding means.

6. In a device of the character described, the combination of a handle, a bowl, a scraper rotatably and removably held in the bowl, a pinion operatively connected to said scraper and removable through the bowl, operating mechanism comprising a rack for engaging the pinion, and means adjacent the bottom of the bowl independent of said rack and said pinion for removably holding the pinion in operative position and the scraper in the bowl said scraper being rotatable while held by said holding means.

7. In a device of the character described, the combination of a handle, a bowl, a scraper rotatably and removably held in the bowl, a pinion operatively connected to the scraper and removable through the bowl, mechanism for rotating the scraper comprising a lever pivoted on the handle and a rack, and means adjacent the bottom of the bowl, independent of the rack, and said pinion for removably holding the scraper in the bowl said scraper being rotatable while held by said holding means.

8. In a device of the character described, the combination of a handle, a bowl, a scraper rotatably and removably held in the bowl, a pinion operatively connected to the scraper and removable through the bowl, a spindle for the pinion, a lever, a rack operated longitudinally by said lever and pivoted thereto, said spindle projecting beyond said pinion, and means between the bowl and the spindle for removably holding the scraper in the bowl.

9. In a device of the character described, the combination of a handle, a bowl, a scraper rotatably and removably held in the bowl, a pinion operatively connected to the scraper and removable through the bowl, a spindle for the pinion, a lever, a rack operated longitudinally by said lever and pivoted thereto, said spindle projecting beyond said pinion, and means engaging the projecting spindle and the bowl for removably holding the pinion in the bowl.

10. In a device of the character described, the combination of a handle, a bowl, a scraper rotatably and removably held in the bowl, a pinion operatively connected to the scraper, means for rotating the pinion, a spindle on the pinion projecting outwardly from the bowl, and an automatically operating catch between the bowl and the spindle, for engaging and yieldingly holding the spindle against inserting and removing pressure.

11. In a device of the character described, the combination of a handle, a bowl on the handle, a scraper rotatably and removably held in the bowl, mechanism for operating the scraper, a spindle for the scraper fitted in an opening in the bottom of the bowl, and a resilient catch between the bowl and the spindle for holding the scraper and spindle in operative position.

12. In a device of the character described, the combination of a handle, a bowl on the handle, a scraper rotatably and removably held in the bowl, mechanism for operating the scraper, a spindle for the scraper, and a contractible ring for holding the scraper and spindle in operative relation to the bowl.

13. In a device of the character described, the combination of a handle, a bowl on the handle, a scraper rotatably and removably held in the bowl, mechanism for operating the scraper fitted in an opening in the bottom of the bowl, and a catch carried by the spindle, for engaging a part adjacent the bottom of the bowl to hold the scraper in the bowl.

14. In a device of the character described, the combination of a handle, a bowl on the handle, a scraper rotatably and removably held in the bowl, mechanism for operating the scraper, a spindle for the scraper having a groove therein, and a contractible ring in said groove for holding the scraper in the bowl.

15. In a device of the character described, the combination of a handle, a bowl on the handle, a scraper rotatably and removably held in the bowl, mechanism for operating the scraper, a spindle for the scraper fitted in an opening in the bottom of the bowl, said spindle having a groove therein, and means between the groove and the bowl for holding the scraper in the bowl, said means being adapted to enter said groove and hold the scraper in the bowl.

16. In a device of the character described, the combination of a handle, a bowl on the handle, a scraper rotatably and removably held in the bowl, mechanism for operating the scraper, a spindle for the scraper fitted in an opening in the bottom of the bowl, said spindle having a groove therein, and movable means between the groove and the bowl for holding the scraper in the bowl, said means adapted to enter said groove and hold the scraper in the bowl.

17. In a device of the character described, the combination of a handle, a bowl on the handle, a bearing adjacent the bottom of the bowl, a scraper rotatably and removably held in the bowl, mechanism for operating the scraper, a spindle for the scraper, mounted in said bearing, and provided with a groove, and a catch between the bowl and said groove to removably hold the scraper in position and allow its rotation while so held.

RAYMOND B. GILCHRIST.

Witnesses:
 FRED GERLACH,
 ALFRED CLARKE.